Jan. 6, 1970  F. P. BUNDY  3,488,153
NON-CATALYTICALLY PRODUCED CUBIC AND HEXAGONAL DIAMOND
Filed Dec. 1, 1966  4 Sheets-Sheet 1
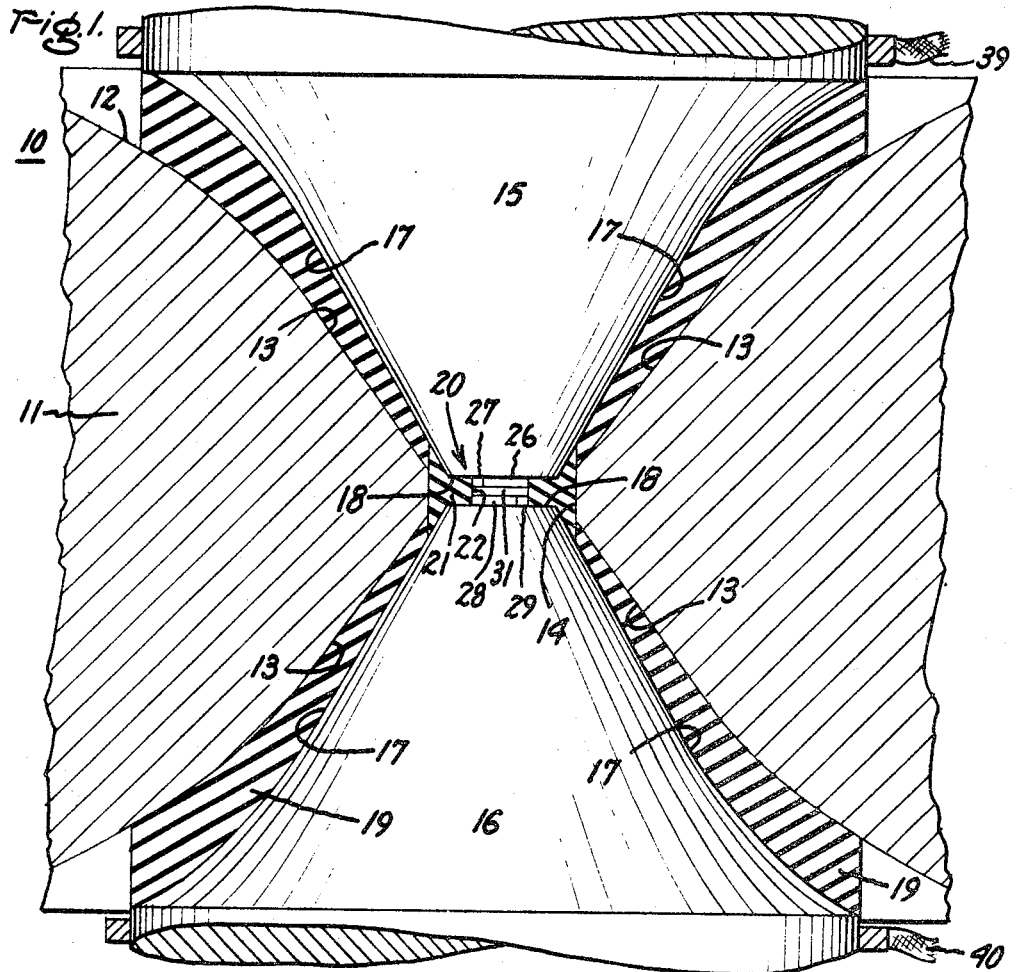
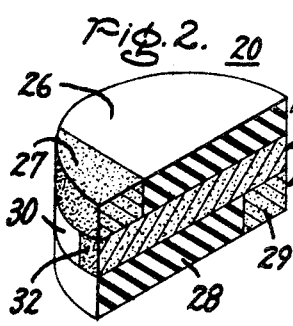
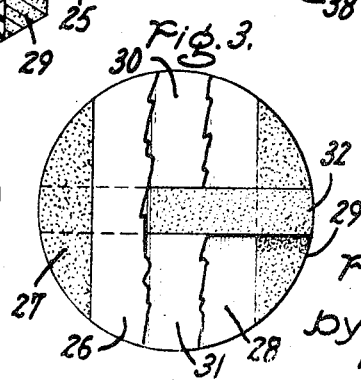
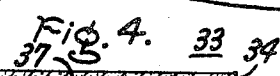
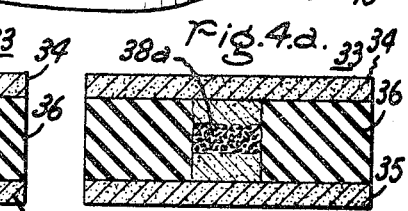
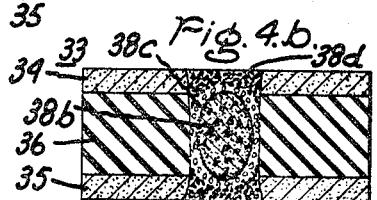
Inventor:
Francis P. Bundy,
by Leo J. MaLassa
His Attorney.

Inventor:
Francis P. Bundy,
by [signature]
His Attorney.

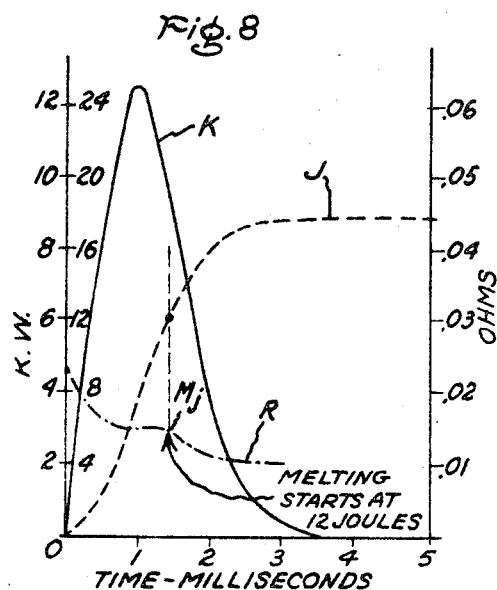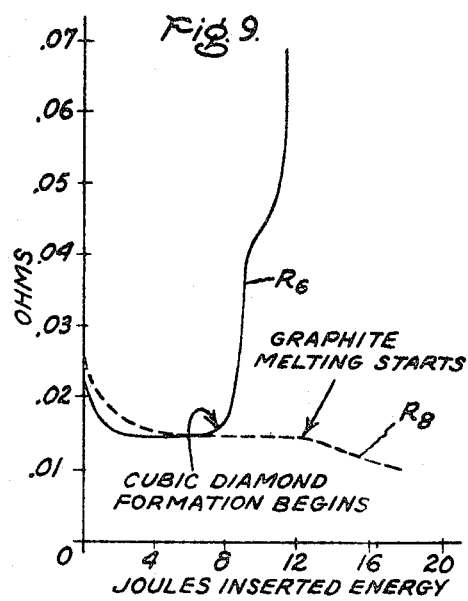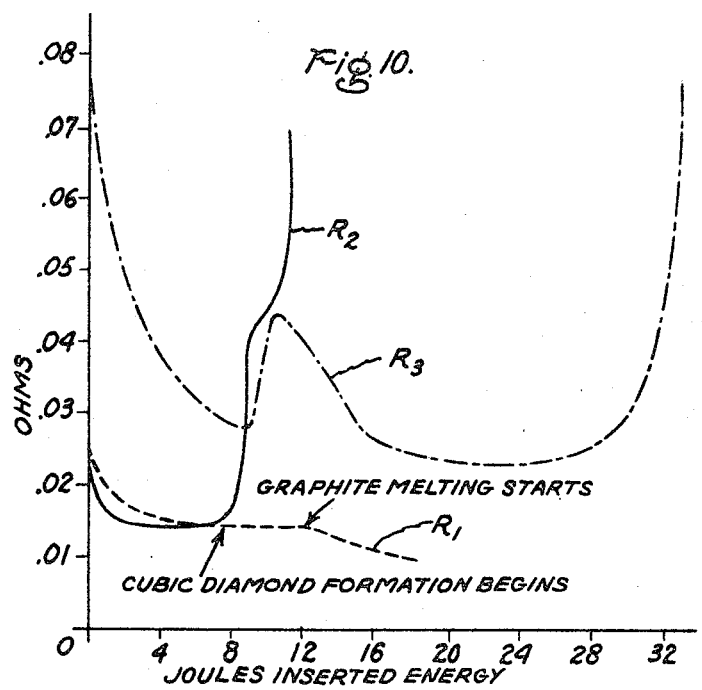

United States Patent Office 3,488,153
Patented Jan. 6, 1970

3,488,153
NON-CATALYTICALLY PRODUCED CUBIC AND HEXAGONAL DIAMOND
Francis P. Bundy, Scotia, N.Y., assignor to General Electric Company, a corporation of New York
Continuation-in-part of application Ser. No. 502,104, Oct. 22, 1965. This application Dec. 1, 1966, Ser. No. 607,107
Int. Cl. C01b *31/06*
U.S. Cl. 23—209.1     17 Claims

ABSTRACT OF THE DISCLOSURE

Static high pressure methods are described for the conversion under well-defined conditions of high pressure and high temperature of:
 (a) carbon material to cubic diamond in the absence of catalyst in a solid graphite-solid cubic diamond reaction;
 (b) particular well-crystallized graphite material to hexagonal diamond in the absence of catalyst in a solid graphite-solid hexagonal diamond reaction, and
 (c) carbon material to cubic diamond in the absence of catalyst during which newly formed electrically conducting cubic diamond is melted and recrystallized as cubic diamond.
Apparatus for controllably simultaneously applying the requisite high static pressures and high temperatures for the requisite times is also disclosed.

---

This application is a continuation-in-part of application Ser. No. 502,104—Bundy, filed Oct. 22, 1969, which in turn is a continuation-in-part of application Ser. No. 191,972—Bunday, filed May 2, 1962 and of application Ser. No. 214,793—Bundy, filed July 30, 1962. The latter application was a continuation-in-part of application Ser. No. 191,914—Bundy, filed May 2, 1962 and all the aforementioned applications were assigned to the same assignee as the instant invention and all have been abandoned.

This invention relates to diamond and its formation or transformation from non-diamond carbonaceous material, and more particularly to the direct conversion of carbon to the hexagonal and cubic lattice forms of diamond at high pressures and temperatures in the absence of catalysts to the diamond making reaction.

The term "carbonaceous material" is used herein to describe a non-diamond material containing carbon, which, under the conditons of the reaction can react, decompose, or otherwise provide non-diamond elemental carbon prior to conversion to diamond. Elemental carbon is the uncombined form of carbon and includes such carbon as may be present in amorphous carbon, lamp black, coal, pitch, tar, etc. Graphite is a preferred carbon starting material because of its known and desirable characteristics, for example, its crystal structure and the relation of its crystal structure to both the cubic and hexagonal diamond crystal structures, its density, impurity content, and the relative ease of its conversion to a diamond lattice.

"Recrystallization" is the term employed generically to denote the changes which occur, when diamond becomes molten at least in part and then, re-solidifies as cubic diamond. "Molten" is indicative of gross melting conditions rather than scattered domain type of melting.

The term "conversion" is employed generically to denote the change or changes which occur in solid carbon to solid diamond conversion, particularly in graphite to diamond conversion, wherein the crystal structure of graphite is caused to change to hexagonal or cubic diamond crystal structure depending on the operating conditions, the particular crystal structure of the starting material and its orientation relative to compression forces. In the practice of this invention this is a direct change to the hexagonal or cubic diamond lattice (as the case may be) without the need of an intermediary material to facilitate the process.

Prior diamond growth techniques, both experimental and commercial have depended upon the subjection of a carbonaceous material, such as graphite, to very high pressures and temperatures in the diamond stable region of carbon on the phase diagram of carbon in the presence of or together with a specified catalyst material. After reducing the high pressure high temperature conditions, cubic diamonds are recovered. The catalyst material for the production of cubic diamond is described as including a metal from those metals of Group VIII of the periodic table of elements, chromium, manganese, and tantalum. The diamond stable region is that region generally described as being located above the graphite-to-diamond equilibrium line on the known phase diagram of carbon.

A method and an apparatus utilized to convert non-diamond carbon to cubic diamond are disclosed in U.S. Patents 2,941,248, Hall; 2,947,610, Hall et al., and 2,947,609, Strong. Briefly, the apparatus of U.S. Patent 2,941,248, Hall, includes an annular belt or die member having a convergent-divergent aperture therethrough, and a pair of oppositely positioned, concentric frustoconical punches which move into said aperture to define a reaction chamber therein. A ceramic or stone gasket of a material, such as pyrophyllite, is employed between the punches and die member for sealing purposes and over the inner surface of the die facing the reaction zone to thermally insulate this portion of the die.

One method of growing cubic diamonds, as described in 2,947,610, Hall et al., utilizes a pyrophyllite reaction vessel to contain reactant materials, for example, graphite and one of the above-mentioned metals. This vessel is placed in the described reaction chamber and motion of the punches towards each other compresses and raises pressure in the vessel. By connecting the punch members to a source of electrical power, a resistance circuit is provided through the punches and the reactant materials in the reaction vessel, for resistance heating thereof. Pressure and temperature are adjusted to provide cubic diamond reaction conditions above the graphite to diamond equilibrium line, where the catalyst metal becomes molten and exerts a catalytic action on the graphite producing cubic diamond growth therefrom. After reduction of temperatures and pressures, cubic diamond is recovered.

There are certain limitations to the foregoing method and apparatus. First, in order to convert graphite to diamond (either hexagonal or cubic) in the absence of catalyst, the apparatus must be capable of controllably exerting much higher pressures to a reaction volume. This is now made possible not only as a result of the reproportioning the punches and die of the conventional "belt" apparatus described in U.S. Patent 2,941,248, Hall but also, because of actual reshaping thereof and utilization of a novel gasket configuration. Next, in the aforementioned method of cubic diamond manufacture strong limitations are placed on the presence of other materials, because of the possibility of interference with the action of the catalyst (which must be present) and consequent prevention of the formation of cubic diamond through this mechanism. With the freedom from the required presence of particular metals made possible by the method of this invention it now becomes possible to safely introduce any of a very wide selection of additive materials to the carbon material to be converted in order to produce selected different characteristics of diamond growth.

Accordingly, it is a first prime object of this invention to provide methods for the direct transformation of a carbonaceous material to cubic diamond.

It is a second prime object of this invention to provide a method for the direct transformation of particular graphitic materials to hexagonal diamond.

It is another object of this invention to incorporate in these improved methods the capacity for independent temperature and pressure control.

It is a further object of this invention to provide a method for the production of cubic and hexagonal diamond compatible with the addition of any of a very wide range of additive materials to selectively influence the physical or electrical properties of the diamond material.

It is still another object of this invention to provide static pressure methods of cubic diamond production in which the diamond-making reaction occurs in less than one-half second.

In combination with the problem of achieving and sustaining the necessary pressure in the very difficult problem, at least in the preparation of cubic diamond by the direct (non-catalytic) conversion described herein, of achieving the requisite high temperatures without melting the construction containing the carbon material being converted. Indirect heating by the use of electrical resistance heating and direct resistance heating are static methods successfully employed to raise the temperature for the preparation of hexagonal diamond, wherein the requisite temperature need not be much higher than about 1000° C. However, when it becomes necessary to reach temperatures in the 3000°–4000° K. range as is the case for conversion to cubic diamond at certain pressures, materials simply do not now exist capable of retaining structural integrity when statically heated to these temperatures to provide containment for the reaction. This is not to say that such materials will never be available. Static heating in the 3000°–4000° K. range will be possible, of course, when such materials are developed. Until such time as static heating becomes feasible for achieving such high temperatures, flash heating (the discharge of electrical current through the graphite in less than one-half second) has provided the capability for creating temperatures beyond the 3000°–4000° K. range without melting the containment for the reaction. Thus, assuming graphite to be converted to cubic diamond receives a very rapidly applied electrical discharge, the center region of the sample becomes very hot while the surrounding portion remains at a lower temperature such that even if the center region becomes molten for the short heating period, this extremely hot material is still safely contained within the surrounding graphite, thereby precluding destruction of reaction cell components.

Thus, although there does not appear to be any reason for assuming that static heating would not produce the same results as flash heating, the latter form of transient heating was employed for all experiments wherein temperatures in excess of about 2500° C. were required.

Briefly described, this invention provides static pressure methods for converting a carbon material to cubic or hexagonal diamond in the absence of a catalyst. The conversion to cubic diamond comprises the steps of:

placing a quantity of material containing carbon in a high pressure high temperature apparatus,
controllably subjecting said quantity of material to pressure sufficient to attain an operating pressure at least as high as the pressure of the solid diamond-solid graphite-liquid carbon triple point,
raising the temperature of said quantity of material to simultaneously subject said quantity of material to conditions of temperature and pressure to the high temperature side of the line of threshold temperatures for the conversion of spectroscopic graphite to diamond,
returning the converted quantity of material to ambient conditions of pressure and temperature, and
recovering cubic diamond from said apparatus.

In the case of conversion of graphite to hexagonal diamond the following steps are carried out:

placing in a high pressure high temperature apparatus a quantity of graphite in which the crystallite domains are relatively large and perfect and the c-axes of the crystallite domains are well-aligned in some given direction,
said quantity of graphite being oriented in said apparatus with the direction of c-axis orientation being substantially aligned with the direction of compressive force application,
controllably subjecting said quantity of material to pressure sufficient to attain an operating pressure at least as high as the pressure of the solid diamond-solid graphite-liquid carbon triple point,
raising the temperature of said quantity of material to simultaneously subject said quantity of material to said operating pressure and to a setting temperature in excess of about 1000° C.,
returning the converted quantity of material to ambient conditions of pressure and temperature, and
recovering hexagonal diamond from said converted quantity of material.

The preparation of cubic diamond broadly described above may be practiced in one modification by employing carbon containing an impurity effective to render electrically conductive the cubic diamond material produced from the carbon under the simultaneous application of high static pressure and transient elevated temperatures induced by discharging electric current therethrough. As a result, when the raising of temperatures is effected at the proper elevated pressure, the carbon converts to electrically conducting cubic diamond and, if the quantity of energy introduced is large enough, the cubic diamond is melted. Upon reducing the temperature, while simultaneously retaining the pressure at a value above the triple point referred to hereinabove, the molten material will recrystallize in part as solid cubic diamond. In the event that the energy input is insufficient to produce melting of the cubic diamond, the carbon is simply converted to solid cubic diamond without the subsequent melting and recrystallization.

Another aspect of the preparation of cubic diamond broadly described above encompasses the conversion of pure forms of carbon, or at least forms of carbon, which do not contain such impurities as will render electrically conductive the cubic diamond material produced from such carbon by the application of high pressures and high temperatures. With such a starting material, even by discharging electrical energy therethrough at a value somewhat in excess of the amount theoretically necessary to raise the temperature of the carbon material above the melting curve for diamond, the temperature will not be raised high enough to produce melting of the cubic diamond, because as cubic diamond is formed on the high temperature side of the line of threshold temperatures referred to hereinabove, the electrically non-conducting nature of this cubic diamond causes interruption of the path of the electrical current. Thus, the carbon is directly converted to solid cubic diamond without any melting thereof.

It has been found that, if heating is effected by applying a transient over-voltage considerably in excess of the energy required to heat pure carbon material to a temperature in the liquid carbon region at a pressure above the solid diamond, solid gaphite, liquid carbon triple point, the wall material enclosing the carbon material may become so hot that it will provide a conducting path in parallel with the path for the transient electrical current provided through the carbon itself. Even though the carbon material converts to non-electrically conducting cubic diamond, if a path for the current becomes available through the wall material, it will continue to heat, become molten, diffuse into and badly contaminate the carbon material to produce a comparatively useless product. Thus, in those cases in which heating is accomplished by the discharge of electric current therethrough, although the amount of energy to be applied is not confined to narrow limits, the amount of energy should be adjusted so that the capacitor charge is almost depleted by the time the carbon material has converted to the cubic diamond form. An estimate of the amount of heat energy required is readily calculable using the data and methods disclosed herein taking into account the nature of the various materials composing the reaction vessel and its contents. Thereafter a small number of trial runs in the particular apparatus being used is sufficient to enable the skilled technician to effectively practice the several aspects of this invention.

However, one of the most interesting aspects of the broad description set forth hereinabove is the discovery that cubic diamond is only one of the forms of carbon that can be created at temperature and pressure conditions in the diamond-stable region of the phase diagram of carbon. Thus, it has been found that graphite always appears to be produced togther with the cubic diamond recrystallized from the molten state in the diamond-stable region and, as well, hexagonal diamond in average crystal sizes larger than the average size of hexagonal diamonds formed in nature in meteorites upon impact thereof with the earth has been produced at temperatures and pressures in the diamond-stable region. The creation of forms of carbon other than cubic diamond in the diamond-stable region indicates with increasing clarity that the superpressure art still remains largely empirical in nature. As more such information comes to light it becomes increasingly evident that in the absense of clear and unambiguous directions as are set forth herein, operations in the diamond-stable region have proceeded with even a lesser degree of certainty than was formerly realized.

The aforementioned objects and many of the attendant advantages of this invention will be readily appreciated as the same become better understood by the following detailed decription when considered in connection with the accompanying drawings in which like reference numerals designate like parts throughout the figures thereof and wherein:

FIG. 1 is an elevational view of a modified belt apparatus as employed to practice this invention;

FIG. 2 is a cross-sectional view of the reaction vessel insertible in the apparatus of FIG. 1 with a specimen contained therein;

FIG. 2a is a mass of cubic or hexagonal diamond recovered from the reaction vessel of FIG. 2 after the practice of this invention;

FIG. 3 is a plan view partly cut away of the reaction vessel of FIG. 2 illustrating the graphite electrodes, sample, and reaction vessel parts in operative relationship;

FIG. 4 is an illustration in cross-section of a modified form of a reaction vessel before any diamond forming process has been conducted;

Figure 5:
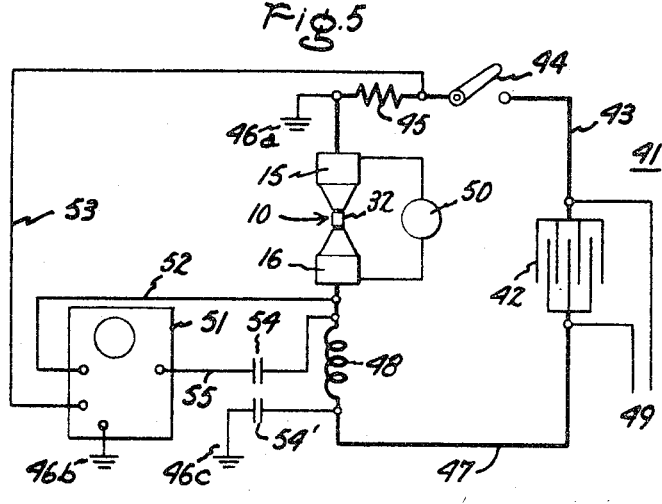
Figure 6:
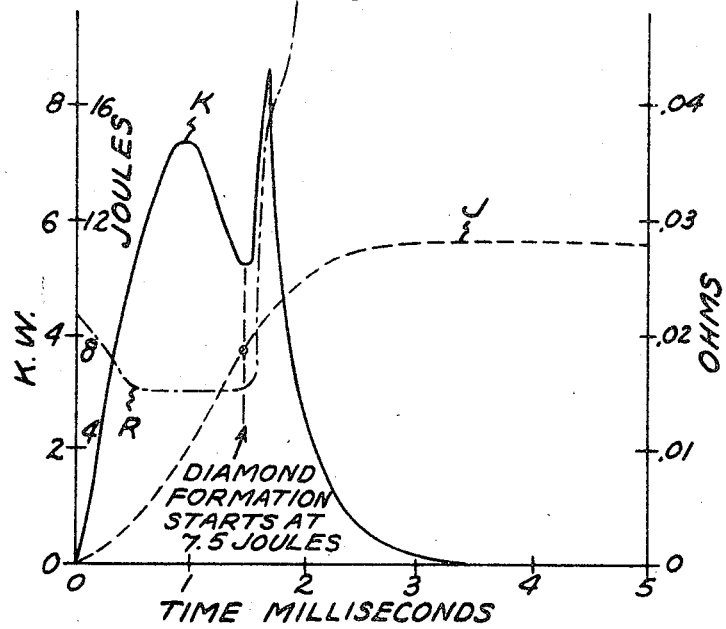
Figure 7:
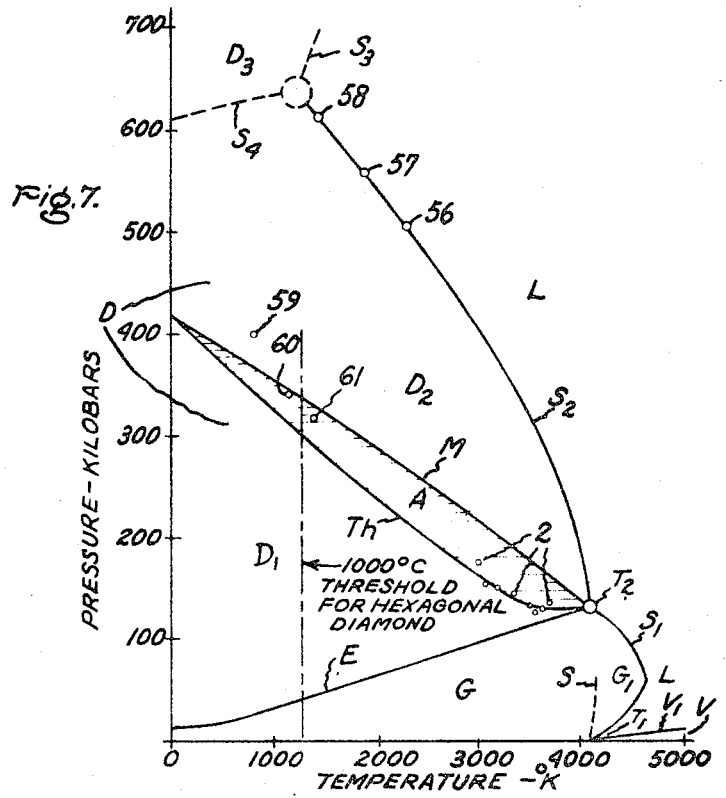
Figure 11:
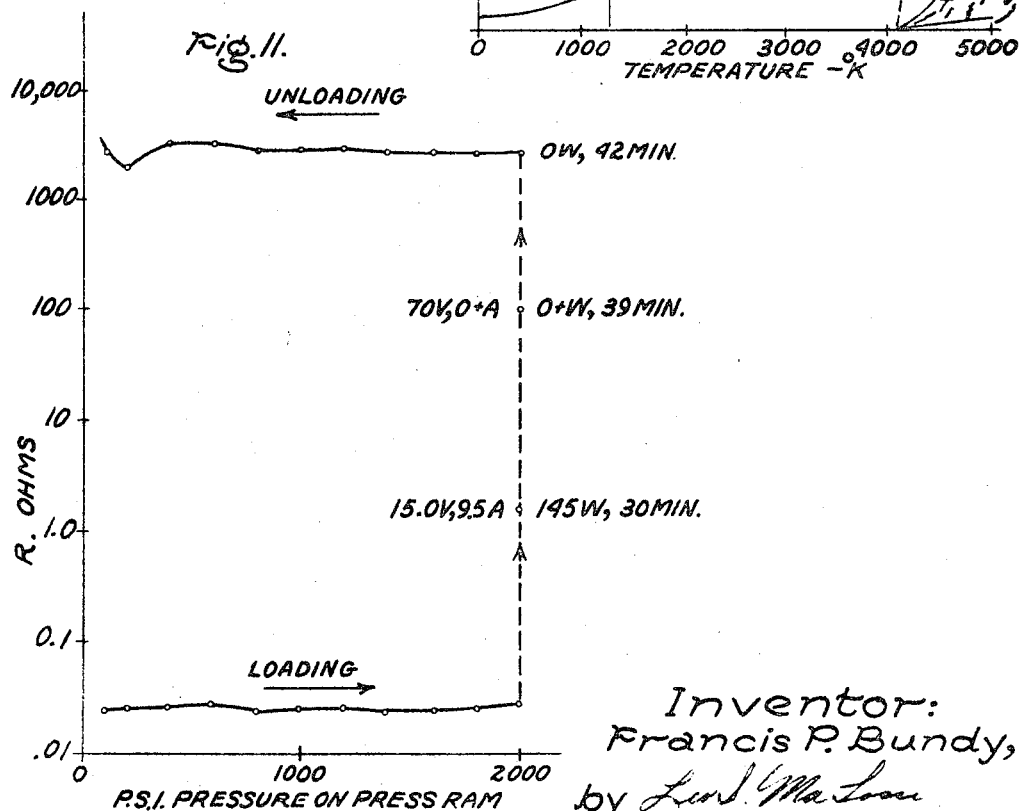

FIG. 4a indicates the changes produced in the reaction vessel of FIG. 4 after the practice of this invention without melting and recrystallization of diamond;

FIG. 4b indicates the changes produced in the reaction vessel of FIG. 4 after the practice of this invention employing diamond melting and recrystallization;

FIG. 5 is a schematic representation of the electrical circuit utilized for the discharge of energy into the apparatus of FIG. 1;

FIG. 6 is a series of curves illustrating kilowatt input, joule input, and electrical resistance of a graphite sample over a period of time in a specific working example as the graphite is converted to cubic diamond;

FIG. 7 is a graph illustrating the phase diagram of carbon with the newly discovered threshold curve for the direct transition of solid graphite to solid cubic diamond;

FIG. 8 indicates the location of the melting point of carbon on a resistance curve for a graphite example and, as well, curves for the kilowatt and joule input to effect melting at a pressure just below the triple point ($T_3$) in FIG. 7;

FIG. 9 is a combined plot of the graphs of FIGS. 6 and 8 with respect to the resistance curves $R_6$ and $R_8$ of FIGS. 6 and 8, respecitively;

FIG. 10 displays a series of resistance curves to provide a comparison of graphite melting, solid graphite direct conversion to solid cubic diamond and cubic diamond formation, melting and then recrystallization as cubic diamond; and FIG. 11 graphically presents the change in electrical resistance resulting in a sample of annealed pyrolytic graphite during the application of high pressure and high temperature thereto, the pyrolytic graphite being disposed in the pressure apparatus with the c-axis orientation thereof extending in the direction of compression of the sample.

Referring now to FIG. 1, apparatus 10, which is a modified form of the belt apparatus disclosed in U.S. Patent 2,941,248, Hall, includes an annular convergent-divergent die member 11 having the converging-diverging aperture 12 therethrough and surrounded by a plurality of hard steel binding rings (not shown) for support purposes. One satisfactory material for die member 11 is Carboloy cemented carbide grade 55A. Modification of the die member 11 in this invention includes tapered surfaces 13 having an angle of about 52.2° with the horizontal, and the provision of a generally right circular cylindrical chamber 14 of 0.200 inch diameter.

A pair of tapered, or frustoconical, punches 15 and 16 of about 1.0 inch O.D. at their bases are oppositely positioned with respect to each other and concentric with aperture 12 and to define a reaction chamber therewith. These punches also utilize a plurality of hard steel binding rings (not shown), for support purposes. One satisfactory material for punches 15 and 16 is Carboloy cemented carbide grade 883. Modification of the punches includes tapering of flank surfaces 17, of a 60° included angle to provide faces 18 of 0.150 inch diameter, and with the tapered portions of the punches being about 0.560 inch in the axial dimension. The combination of the 60° included angle and the 52.2 angle of the tapered surfaces provide a conical annular gasket opening of wedge-shaped cross-section therebetween.

A further modification in this invention relates to sealing means. Sealing, or gasketing, is provided by means of the one-piece gaskets 19 of pyrophyllite. Conical annular gaskets 19 between the punches 15 and 16 and die member 11 are of wedge-shaped cross-section to fit the defined space and are of sufficient thickness to establish a distance of 0.060 inch between punch faces 18.

The essential modifications incorporated in the apparatus of this invention, which provide this apparatus with a capability of reaching very high pressures in the range of 100 to 180 kilobars and above, relate to ratios of certain given dimensions. These dimensions are, (1) the diameter of the punch face portion 18, (2) the distance between the punch face portions 18 in the initial position as illustrated in FIG. 1, before compression, and (3) the slant height of the gasket 19 along the flank or tapered portion 17 of the punches. In operative working examples of the apparatus of this invention, the ratio of the gap G (distance between punch faces 18) to the diameter D of the face portion 18, is less than about 1.0, preferably blow about 0.50. The slant length L of gasket 19 as predicated upon the diameter of the face portion 18 is 6 times D ($L/D=6$). These values are compared to those of U.S. Patent 2,941,248—Hall, which are generally $G/D=2.0$ and $L/D$ is less than about 1. These preferred ratios provide a greater amount of lateral support for the punches 15 and 16 without extensively increasing the required component of applied force necessary to compress the gasket for pressure rise in the reaction vessel.

A reaction vessel 20 is positioned between the punch faces 18. In this instance reaction vessel 20 includes a cylindrical or spool shaped pyrophyllite sample holder 21 having a central aperture 22 therethrough. The parts to be positioned in aperture 22 in their operative relationship are more clearly illustrated in FIG. 2 without sample holder 21. Reaction vessel 20 includes both the sample material and its heating means, in the form of a solid right circular cylinder comprising three coaxially stacked disc assemblies 23, 24, and 25. Disc assembly 23 includes a larger (¾) segmental portion 26 of pyrophyllite, and a smaller (¼) segmental portion 27 of graphite for effecting electrical conduction through vessel 20. Disc assembly 25 also includes a like larger (¾) segmental portion 28 of pyrophyllite, and a like smaller (¼) segmental portion 29 of graphite for the same purpose. Disc assembly 24 includes a pair of spaced apart segmental portions, of which only portion 30 is shown in FIG. 2, of pyrophyllite with a bar-shaped graphite sample 32 therebetween. Graphite sample 32 is about 0.020 inch thick by 0.025 inch width by 0.080 inch length. Each disc assembly 23, 24, and 25 is 0.080 inch diameter by 0.020 inch thick. FIG. 3 illustrates the reaction vessel of FIG. 2 in a cutaway plan view for more specific indication of the operative relationship. Both segmental portions 30 and 31 are shown therein. From either FIG. 2 or FIG. 3, it can be seen that an electrical circuit is established from graphite segment electrode 27 through sample 32 to graphite segment electrode 29 for electrical resistance heating of the sample 32.

FIG. 4 illustrates modification of reaction vessel 20. In FIG. 4, reaction vessel 33 includes a pair of graphite discs 34 and 35 of about 0.010 inch thickness, which act as graphite electrodes for electrical resistance heating. An intermediate pyrophyllite cylinder 36 has a centrally-located aperture 37 therethrough, which is adapted to contain sample 38. Sample 38 in one form is a graphite cylinder of 0.030 inch diameter and 0.040 inch length.

Apparatus 10 as described provides desired pressures in the region above the graphite-to-diamond equilibrium line E on the phase diagram of carbon as illustrated in FIG. 7. Operation of apparatus 10 includes placing the apparatus as illustrated between the platens of a suitable press and causing punches 15 and 16 to move towards each other thus compressing the reaction vessel and subjecting sample 32 (38) to high pressures. To calibrate the apparatus for high pressures, the calibration technique as given in aforementioned U.S. Patents 2,941,248 and 2,947,610 may be employed. This technique includes the subjecting of certain metals to certain pressures with the apparatus knowing that at the points at which an electrical phase transition for each of these materials occurs, pressures of known magnitude are indicated. For example, during the compression of iron a definite reversible electrical resistance change will be noted, when a pressure of about 130 kilobars is applied. By the same token then, an electrical resistance change in iron denotes the application of 130 kilobars pressure by the apparatus.

The following table is indicative of the metals employed in the calibration of the belt apparatus as described:

TABLE I

| Metal: | Transition pressure kilobars |
|---|---|
| Bismuth I[1] | 25 |
| Thallium | 37 |
| Cesium | 42 |
| Barium I[1] | 59 |
| Bismuth III[1] | 89 |
| Iron | 130 |
| Barium II | 141 |
| Lead | 161 |
| Rubidium | 193 |

[1] Since some metals indicate several transitions with increasing pressure, the Roman numerals indicate the transition utilized, in sequential order.

A more particular description of methods employed to determine the above transition values may be found in publications of Calibration Techniques in Ultra High Pressures, F. P. Bundy, Journal of Engineering for Industry, May 1961; Transactions of the ASME, Series B, and P. W. Bridgman, Proceedings of the American Academy of Arts and Science, vol. 74, p. 425, 1942, vol. 76, p. 1, 1945, and vol. 76, p. 55, 1948. The Bridgman values were later corrected to their present values as given in the above Table, R. A. Fitch, T. F. Slykhouse, H. G. Drickamer, Journal of Optical Society of America, vol. 47, No. 11, pp. 1015–1017, November 1957, and A. S. Balchan and H. G. Drickamer, Review of Scientific Instruments, vol. 32, No. 3, pp. 308–313, March 1961. By utilizing the phenomenon of electrical resistance changes of the metals at the pressures given, a press is suitably calibrated to provide a reading for the approximate pressure reached within the reaction vessel.

The graphite sample 32 (38) may be subjected to very high temperatures, where desirable or necessary, by transient electrical resistance heating by the rapid discharge of current therethrough. By connecting a source of power (not shown) to each punch 15 and 16 with electrodes 39 and 40 current may be discharged, for example, through punch 15 to graphite electrode 27, through sample 32 and graphite electrode 29 to punch 16.

One arrangement for a circuit employed for discharging current through sample 32 or 38 is best described with respect to FIG. 5. Generally speaking, the circuit 41 is a capacitor discharging circuit, which discharges current through apparatus 10, as has been described. During the discharge the oscilloscope tracing is photographed. Later, the photograph is analyzed for the values of the voltage and current applied from which the resistance and power conditions during the discharge are derived. These values are then coordinated with values accumulated by direct reading before and after the discharge. In FIG. 5, circuit 41 includes a bank 42 of electrolytic capacitors having a capacity of about 85,000 microfarads. Capacitor bank 42 is capable of being charged up to about 120 volts. Lead 43 connects one side of capacitor bank 42 to upper punch 15, through switch 44 and a nonconductive current resistor 45 of 0.00193 ohm. Resistor 45 includes ground connection 46a. The other side of capacitor bank 42 is connected by means of lead 47 to punch 16 through an inductance choke coil 48 of 25 microhenries and 0.0058 ohm resistance. Capacitor bank 42 is charged from a suitable source of power 49 (not illustrated). It can thus be understood that, after charging capacitor bank 42, switch 44 may be closed to discharge current through sample 32 in reaction vessel 20.

If the temperatures to be employed are less than about 2500° C., indirect heating with a resistance heater sleeve of a stable material, such as platinum, tantalum, Invar, etc. surrounding and spaced and insulated from the reaction zone may be used or direct static electrical resistance heating can be employed using the structures shown in FIGS. 2 and 4.

Thermal flow calculations with respect to cold graphite surrounded by such materials as pyrophyllite, magnesium oxide (MgO) and boron nitride (BN), and based on ordinary values of thermal conductivity and heat capacity, indicate that the period of time for the temperature at the center of a graphite sample in the reaction vessel of FIG. 2 to cool off by a factor of one-half is about 0.015 second. The described electrical circuit is designed to provide injection of the required heating energy in about 0.001 to 0.004 second, which is considerably more rapid than the aforementioned cool off period.

The most expedient manner of observing the behavior of an electrically conductive sample is by means of electrical resistance measuring. As is well known, graphite is considered to be an electrical conductor while cubic diamond is considered an electrical insulator. In this invention where graphite sample 32 is a connecting link of the circuit as described, the transformation or conversion of graphite to diamond (cubic or hexagonal) will be indicated by an increase in resistance and/or the reaching of open circuit conditions in the case of cubic diamond. In the practice of this invention, therefore, a Kelvin bridge resistance meter 50 is connected to top punch 15 and bottom punch 16 to measure the resistance through the reaction vessel or sample 32.

For a graphic indication of the voltage and current passed through sample 32, circuit 41 includes a Tektronix 535A oscilloscope 51 connected to punch 16 by lead 52 to detect the voltage signal, and connected by lead 53 to lead 43 between switch 44 and resistor 45 to detect the current signal. Oscilloscope 51 includes a ground connection 46b as illustrated. The ground 46a of circuit 41 is located between sample 32 and the current resistor 45 so that the voltage and current signals to the oscilloscope 51 have a common ground. Oscilloscope 51 provides a recording interval that corresponds to the capacitor bank discharge time with 0–5 and 0–10 milliseconds having been employed for the examples of this invention. The oscillogram was photographed with a Land Polaroid camera mounted in front of the screen.

Various arrangements may be utilized to provide a triggering signal for oscilloscope 51. One convenient circuit utilizes a capacitor 54 of 1 microfarad capacity connected by lead 55 from one side of induction choke coil 48 to oscilloscope 51. An additional capacitor 54' of 1 microfarad capacity is connected from the other side of inductance choke coil 48 to ground 46c. The sweep triggering signal is thus about the value of the voltage drop across inductance choke coil 48. It is understood that many variations of this circuit are also applicable for the intended purpose. For example, more oscilloscopes may be employed or the oscilloscope and its circuitry may be dispensed with, when measurements are unnecessary.

Temperature rise in the sample in the case of transient heating is determined by calculation, since there are no known instruments which will record temperatures of such high values in such short periods of time with a satisfactory degree of accuracy. Temperature calculations are based in part on the known values of the specific heat of graphite over a wide range of temperatures. Such values have been experimentally determined and compared with prior art values. For example, see L. M. Currie, V. C. Hamister, H. G. McPherson, "The Production and Properties of Graphite for Reactors," a paper presented at the United Nations International Conference on The Peaceful Uses of Atomic Energy, Geneva, Switzerland, August 8–20, 1955, published by National Carbon Co. Also J. E. Hove "Some Physical Properties of Graphite as Affected by High Temperature and Irradiation," Industrial Carbon and Graphite, Society of Chemical Industries, London, 1958. The correlated values from the above references were employed in the temperature calculation of this invention and are given in the following table:

TABLE 2

| T (° K.): | Cp. (Cal./mole ° K.) |
|---|---|
| 300 | 2.05 |
| 500 | 3.49 |
| 750 | 4.48 |
| 1000 | 5.14 |
| 1250 | 5.35 |
| 1500 | 5.75 |
| 2000 | 6.0 |
| 2500 | 6.2 |
| 3000 | 6.35 |
| 3500 | 6.5 |
| 4000 | 6.65 |

When the above values are plotted in curve form with $Cp$ (Cal./mole ° K.) as the ordinate and $T$(° K.) as the abscissa, the area under the curve may be integrated and plotted to provide a further curve indicating Q (K cal./mole) versus T° K., or the temperature versus molar energy insertion for graphite. By the same token, substitution of the above table of values in the equation $$Q=\int_{T_0}^{T} Cp(T)dT$$

provides the same result. Q is heat input in Kcal./mole, $T_0$ is initial temperature, T is final temperature and $Cp$ is specific heat.

The following Table 3 provides exemplary values of Q and $T_0$:

TABLE 3

| Q (Kilocalories/mole): | T° K. |
|---|---|
| 0 | 300 |
| 5 | 1450 |
| 10 | 2250 |
| 15 | 3050 |
| 20 | 3800 |
| 25 | 4600 |

From the oscillograph reading of voltage and current, the product of EI (or voltage times current) provides an indication of power or wattage input at any instant of time. Thus, curve K (FIG. 6) is provided indicating kilowatt input to the sample as a function of time.

The relationship of voltage divided by current equals resistance or, $R=E/I$. The E and I values are taken from the oscillogram and the $E/I$ value provides a resistance curve, which is illustrated in FIG. 6 as curve R.

The product of kilowatts multiplied by the time in milliseconds, which is the integral of the area under the kilowatt curve, equals the joule energy input to the sample, illustrated in FIG. 6 as curve J.

In calculating the temperature reached in the sample, corrections must be made with respect to certain losses. The nature of the losses and the manner of correcting therefor are as follows: (1) the loss of heat generated in the end electrode regions for example between input at one of the electrodes (27 or 29) and the sample 32; since the materials and changes in cross section are known, this heat loss may be calculated; (2) thermal conduction losses to the walls of the reaction vessel; by performing operations in reaction vessels having different wall materials and measuring the cool-off time, the heat loss, as based upon the known graphite melting temperature, is determined for a given reaction vessel configurations; and (3) electrical leakage loss in the walls, which become more conductive at high temperatures; by performing several operations in reaction vessels having different wall materials, a comparison may be made of the results to determine this loss. Accordingly, because of these more important corrective factors, temperature values may vary as much as ±10%. The desired temperature in the sample may be attained by varying the electrical charge or capacity of circuit 41. At the same time, however, the final temperature reached in the graphite sample 32 (or 38) is not only predicated upon the electrical energy introduced therein, but also on its particular configurations.

The operative conditions or region of operation with respect to pressures and temperatures of the reaction of this invention are best described with relation to FIG. 7. In FIG. 7, there is illustrated a phase diagram of carbon with the ordinate indicating a scale of pressures in kilobars and the abscissa indicating temperatures in degrees Kelvin. The "bar" unit of pressure measurement is utilized in this specification as a measure of pressure conditions and is more acceptable in the high pressure art by being an absolute unit. The kilobar is $10^9$ dynes/cm.$^2$, and is equivalent to 1020 kg./cm.$^2$ or 987 atmospheres.

The previously known graphite-to-diamond equilibrium line between the graphite stable region G and a portion of the diamond stable region $D_1$ is indicated as E. Region G is defined as a graphite stable region and a diamond metastable region indicating that graphite and diamond both exist in this region but that diamond is thermodynamically unstable therein. Region $D_1$ (with line M defining its upper limits) is denoted as a diamond stable and graphite metastable region, since both forms of carbon exist in this region but graphite is thermodynamically unstable therein. As is disclosed herein, the hexagonal form of diamond can also exist in regions $D_1$ and G, but absolute data as to the thermodynamic stability of hexagonal diamond are not yet available. The portion of line E up to about 1200° Kelvin and 50 kilobars, represents that portion of the graphite to cubic diamond equilibrium line originally calculated by thermodynamic calculations based on experimental values of the physical properties of diamond and graphite. See F. D. Rossini and R. S. Jessup, Research Journal National Bureau of Standards, vol. 21, p. 491, 1938. The remaining portion of line E of the graphite to cubic diamond equilibrium line has been extrapolated by R. Berman and F. Simon, Zeit. Elektrochem, vol. 59, p. 333 (1955). By experimental evidence in conjunction with growing cubic diamonds, the extrapolation has been substantially verified so that the line E exists approximately as indicated in FIG. 7 up to about 120 kilobars. See Diamond-Graphite Equilibrium Line from Growth and Graphitization of Diamond, Journal of Chemical Physics, vol. 35, No. 2, pp. 383-391, 1961. It should be obvious to those skilled in the art that variances in the position of the equilibrium line E do not adversely affect the teachings of this invention since the essential requirements are operating conditions above this line, wherever this line is positioned and/or in the cubic diamond stable region of carbon obtained by any calibration technique of a particular apparatus.

An important line on this diagram is the melting line of graphite, which line commences, as is known in the art, at the triple point $T_1$ located at about 0.12 kilobars and 4050° K. Point $T_1$ is known as the triple point for carbon (graphite) as a solid, liquid, and vapor. This point was experimentally determined by J. Basset, Journal of Physics Radium, vol. 10, 1939, and T. Noda reported by H. Mü, Proc., International Symposium on High Temperature Technology, Asilomar Conference Grounds, Calif., Oct. 6-9, 1959; Stanford Research Institute, Menlo Park, Calif., published by McGraw-Hill Book Co., Inc., New York. Point $T_1$ indicates that point where carbon may exist simultaneously in the graphite solid, liquid, and vapor state, and defines together with lines $V_1$, $S_1$ and $V_s$ (not shown), the solid (graphite) region G, liquid region L, and vapor region V, of carbon. The line $V_s$ is not shown but rises from 3860° K. at room temperature, to $T_1$. The V region is exaggerated so that it may be illustrated in the drawing.

It was discovered that line S, which was formerly considered to be the trace of the boundary line between solid and liquid carbon, is not an accurate presentation thereof. As has been newly discovered, the solid-liquid carbon boundary takes the form of line $S_1$ as illustrated. Line $S_1$ commences with a positive slope upwardly from point $T_1$ and changes to a negative slope to approach point $T_2$. The discovery of the curve characteristics of line $S_1$ was a result of a series of operative examples of melting graphite at different pressures and noting the melting temperature. The process of melting graphite is described as follows:

The electrical resistance characteristics of most graphites are such that the resistance decreases with increasing temperature. However, upon melting at high pressure, the resistance of graphite decreases with a sharp break in the resistance curve. The result of many melting experiments with graphite reveals that the melting temperature conditions agree favorably with values reported in the art, Basset and Noda above-mentioned. An examination of many graphite samples both before and after each melting experiment indicates the melting of the graphite quite clearly. Before melting, the cross section of a graphite rod or bar appears as a coarse, irregular, or random grain structure. After melting and cooling, a cross section of a similar graphite rod or bar indicates a structure of dendritic graphite needles radially oriented and extending from the colder portion of the periphery towards the center. Additionally, X-ray diffraction patterns of ordinary graphite were compared to X-ray diffraction patterns of a sample of recrystallized molten graphite at locations in a sample where the graphite did and did not melt. These patterns were similar for the ordinary graphite and the portions of a sample that did not melt. However, the diffraction lines of the melted portions are substantially sharper showing that the recrystallized graphite has much larger and more regularly oriented crystallites than the unmodified or unmelted portion. The appearance is quite similar to a cross section of a quenched metal (chilled casting).

The following Table 4 illustrates several examples of graphite melting. In each instance examination of the graphite sample clearly evidenced melting as described. Em is the term denoting the energy input, Kcal./mole, per unit weight of sample required to bring the sample to its melting point. In these examples, the graphite employed was graphite of spectroscopic purity. Table 4 is exemplary, as various other graphites as hereinafter described were also melted. The reaction vessel wall materials are varied for further corroboration of the results. Reaction vessel materials as well as gasket materials may include for example pyrophyllite (Py), catlinite, talc, magnesium oxide, alumina, thoria, and other similar stones and ceramics, for all operations including the diamond reaction. Wall materials relate to disc segments 26, 28, 30 and 31 to FIG. 2 and cylinder 36 of FIG. 4. It has been found that within the calibration range of the apparatus, the various wall materials do not appreciably affect the pressure employed. Temperature rise in case of transient heating will cause the pressure in the reaction vessel to rise. Such a pressure rise is estimated to be in the range of 10-20 kilobars but may exceed this range.

Operative practices in these examples are similar to the general operation of the apparatus as previously described. The practice briefly includes assembling the reaction vessel as illustrated in FIGS. 2 or 4, and placing the vessel in position in apparatus 10 of FIG. 1. By means of a press apparatus (not illustrated), punches 15 and 16 are caused to move together to raise the pressure in the reaction vessel to the given value. Thereafter, circuit 41 is caused to discharge electrical energy through the sample to provide the requisite heating. The pressures indicated are comparable and are considered equivalent in the range of calibration of the apparatus.

TABLE 4

| Example No.: | Reaction vessel | Wall matl. | Pressure, kilobars | Electrical Energy | | Em Kcal./ mole | |
|---|---|---|---|---|---|---|---|
| | | | | Volts | Farads | | |
| 1 | Figure 4 | Py | 117 | 30 | .040 | 24 | not melted. |
| 2 | do | Py | 121 | 32 | .040 | 26 | not melted. |
| 3 | do | Py | 118 | 40 | .040 | 28 | melted. |
| 4 | do | Al$_2$O$_3$ | 119 | 40 | .040 | | Do. |
| 5 | Figure 2 | BN | 115 | 25 | .085 | 29 | melted. |
| 6 | | BN | 97 | 110 | .080 | 31.5 | melted. |
| 7 | | BN | 77 | 110 | .080 | 33 | melted. |
| 8 | | BN | 66 | 110 | .080 | 36 | melted. |
| 9 | | BN | 60 | 110 | .080 | 35 | melted. |
| 10 | | BN | 47 | 110 | .080 | 33.5 | melted. |

Examples 6–10 of Table 4 were performed at lower pressures and the belt apparatus and reaction vessel were of the type set forth in aforementioned U.S. Patents 2,941,248, Hall and 2,947,610, Hall et al. The sample was a graphite rod 0.040 inch diameter and 0.280 inch length surrounded by a boron nitride sleeve. Many melting examples in addition to those listed above and conducted both at lower and at higher pressures have been carried out to determine the position and shape of melting point line $S_1$ on FIG. 7. It was noted in the course of the examples of melting graphite that an area enclosed by curve $S_1$ and bounded by line S is a graphite zone $G_1$. In some melting examples small cubic diamond seeds were embedded in the graphite sample. It was found that the cubic diamond crystals always graphitized before the melting point of graphite was reached, and that the threshold temperature of the graphitization was very sharp with graphitization complete. The graphitization occurred about 300° to 400° lower in temperature than melting line $S_1$.

Line M (FIG. 7), an extension of line $S_1$, is the instantaneous metastable graphite melting line and indicates the lower border of region $D_2$. Above line M, carbon must exist as some form of diamond. The points 56, 57, 58, 59 and 60 have been determined from pressure/volume data presented in "Behavior of Strongly Shocked Carbon" by B. J. Alder and R. H. Christian (Physical Review Letters, 7, 367, [1961]); point 61 has been calculated from information reported in "Formation of Diamond by Explosive Shock" by P. S. DeCarli and J. C. Jamieson (Science 133, 1821, [1961]). The locations of points 60 and 61 obtained by shock compression conversion of carbon corroborate the location of line M.

An exemplary illustration of a melting point $M_j$ of graphite is illustrated in FIG. 8, which shows the K, J, and R curves for Example 3 (Table 4). The melting point $M_j$ is clearly evidenced by a sharp drop in the resistance curve as illustrated. This $M_j$ point compares favorably to the $M_j$ point of the remaining samples. The calculated temperature of melting as extrapolated to atmospheric conditions also compares favorably with prior art knowledge of the melting point of graphite at about 4050° K.

In attempting to perform the melting examples at higher pressures, it was unexpectedly discovered that graphite converted to either hexagonal or cubic diamond at temperatures less than those at point $T_2$ and before any melting of the graphite occurred. Moreover, the conversion furthermore took place without the presence of any catalyst material as previously considered necessary.

The unexpected nature of this discovery is indicated by the fact that one of the discoverers of the catalytic conversion of non-diamond carbon to cubic diamond considered the possibility of direct conversion (i.e. without the benefit of catalyst, solvent or similar mechanism) of graphite to cubic diamond at high pressure and high temperature and concluded that cubic diamond cannot be formed directly from graphite (H. T. Hall, Proceedings of the Symposium on High Temperature "A Tool for the Future," June 25, 26, 27, 1956. pp. 164–165).

CONVERSION TO CUBIC DIAMOND WITHOUT MELTING IN THE ABSENCE OF CATALYST

Exemplary of the practice of converting graphite to cubic diamond by this invention, reaction vessel 33 was assembled with a 0.65 mg. spectroscopic graphite sample as illustrated and described with respect to FIG. 4 and was placed in the belt apparatus as in FIG. 1. Apparatus 10 was then positioned between a pair of platens in a hydraulic press to compress reaction vessel 33 to raise the pressure in graphite sample 38 to about 130 kilobars in the region of the iron transition by press calibration. Pressure rise to the iron transition region may be accomplished slowly or rapidly with no change in the final result, and may also be incremental or constant. In this exemplary practice, pressure rise was completed in about 3 minutes.

After pressure rise was completed and after circuit 41 had been charged, switch 44 closed for a discharge of 0.085 farad at approximately 18 volts through the apparatus and sample. After the circuit discharge, an examination of resistance readings on the Kelvin bridge resistance meter 50 showed a rise in resistance or open circuit condition indicating that graphite sample 38 had converted or changed from its electrically conducting characteristics as graphite, to its nonconducting characteristics as cubic diamond.

In the above example, as well as in the hereinafter tabulated cubic diamond producing examples, a series of curves (K, J and R) was drawn as illustrated in FIG. 6. The K curve indicates the kilowatt input to the graphite sample. The J curve illustrates the energy input in joules and the R curve illustrates a continuous reading in ohms. As previously described, integration of the area under the kilowatt curve with respect to time will provide the joule input curve from which the temperature in the sample may be calculated within the limitations as described. Upon the discharge of electrical energy (transient heating) through sample 38, the resistantce of sample 38 decreases until a point is reached, at about 1.5 milliseconds on the R curve, where the resistance begins to rise. At this point conversion of graphite to cubic diamond is taking place. Depending on the degree and amount of conversion, curve R may rise to infinity indicating open circuit conditions or show a lower rise to illustrate partial converson, i.e., a portion of the graphite converts.

After removal of reaction vessel 33 from apparatus 10, it was noted upon examining sample 38 that the sample retained the cylindrical configuration of the original sample but had experienced a small reduction in height (see FIGS. 4a and 4b). Measurement of the height reduction indicates that it corresponds to the decrease that would reflect the change in density from graphite to diamond. The cylindrical form 38a was a polycrystalline disc located in the center portion of the height of the original sample and contained a great number of very small diamond crystallites of a dark color and about 1 micron in longest dimension. Unconverted pure graphite remaining of the original sample rod is shown at the ends thereof. The verification of cubic diamond included cleaning the sample in a heated mixture of concentrated sulphuric acid, ($H_2SO_4$) and potassium nitrate ($KNO_3$) and subjecting the sample to scratch tests, buoyancy tests and X-ray analysis, all of which conclusively indicated diamond. The X-ray analysis of a number of these recovered samples both before and after cleaning showed that the entire mass was cubic diamond and essentially all graphite therein had been converted to cubic diamond.

Molten graphite is not only electrically conductive but also has less electrical resistance than solid graphite. In the conversion of graphite to cubic diamond by this invention, the resistance curve R breaks sharply upward to infinity or open circuit condition. This upward curve (sharp increase in resistance) takes place before any sharp downward occurs. In fact, the conversion to cubic diamond provides open circuit conditions and if temperature conditions were such as to carry temperatures beyond the point at which the cubic diamond would become molten carbon such a condition would have to be manifest as a change with the resistance curve turning downwardly. However, no gross melting occurs because no drop in the resistance curve is noted. This is clearly illustrated by comparison of the resistance curve R of FIG. 6 with the resistance curve R of FIG. 8. Graphite conversion to cubic diamond starts at 7.5 joules (FIG. 6), while graphite melting starts at 12 joules, FIG. 8. These resistance curves were obtained by identical samples with only pressure and electrical energy input changed. In the examples of FIG. 6 and FIG. 8, the pressures were 130 and 118 kilobars, respectively. In the run graphically represented in FIG. 8, the graphite would have been converted to cubic diamond had the pressure been at 130 kilobars. The practice of this aspect of the invention below the melting point of graphite is established by comparison of these two exemplary resistance curves as more clearly illustrated in FIG. 9.

In FIG. 9, $R_6$ denotes the resistance curve R of FIG. 6 and $R_8$ denotes the curve R of FIG. 8. These curves are plotted with respect to the joule input to the sample. It is noted that cubic diamond formation commences in the $R_6$ example at about 7.5 joules input with the curve rising sharply upwards. Cubic diamond was recovered from this sample. The $R_8$ curve illustrates melting of the graphite starting at about 12 joules. Examination of this sample indicated evidence of melting as described previously. An important feature to note is that about 4.5 joules input separates the onset of the conversion to cubic diamond and the start of the graphite melting process.

When transient heating is employed in the practice of this invention, a predetermined amount of electrical energy is inserted in a predetermined graphite sample and cubic diamond is recovered. Ordinarily, more energy is inserted than that just necessary to pass the threshold temperature (i.e. the temperature at a given pressure at which the onset of conversion of graphite to cubic diamond occurs), to secure more complete conversion, and to ascertain entry into the conversion region for cubic diamond. However, unless the overvoltage is excessive so as to cause sufficient melting of the sleeve enclosing the carbon (preferably graphite) sample to establish a separate path for the heating current, when pure graphite converts to cubic diamond, the discharge circuit is immediately opened, because cubic diamond is electrically non-conductive. This is a distinctive feature of this invention, and variance of energy insertion in duplicate samples indicates that the open circuit conditions occur at the same time. Thus, while the available energy may be sufficient to melt graphite, the occurrence is prevented by the conversion process and resultant open circuit conditions.

If, on the contrary, the graphites chosen for the practice of this invention contain such impurities as will result in the production of electrically conductive cubic diamond, it has been found that open circuit conditions can be avoided. Boron is one impurity which produces electrically conducting cubic diamond. Other impurity materials for producing electrically conducting cubic diamond from carbon material containing these impurities are disclosed in U.S. Patent No. 3,148,161, Wentorf, Jr. et al.

Examples illustrative of the practice of this invention wherein the conversion of non-diamond carbon to cubic diamond is effected without melting of the diamond either because of the non-electrically conducting nature of the cubic diamond material produced, or because of a limitation in the amount of electrical energy input to an impurity-containing carbon starting material are set forth in Table 5 to follow.

Operative techniques associated with these examples are similar to those previously described in the example illustrating the production of cubic diamond and in the graphite melting example. All procedures utilized in these examples are similar to those employed with respect to Table 4 examples. All wall materials are as noted. Under the heading "Reaction Vessel" size L is approximately 0.080 inch length, 0.022 inch height and 0.025 inch width, and size S is approximately 0.080 inch length, 0.018 inch height and 0.022 inch width. The sample size for the FIG. 4 examples is standardized at approximately 0.030 inch diameter and 0.040 inch height unless otherwise noted. The absence of any size notation indicates a sample size as described herein with respect to the particular reaction vessel configuration. In Table 5, Sp is spectroscopic graphite, Pg is pyrolytic graphite, B344 is boron-containing graphite, SB is Shawinigan Black, Py is pyrophyllite, Alua is alumina and MgO is magnesia.

The particular graphites employed in these examples or in the practice of other aspects of this invention are described as follows:

Spectroscopic rod or electrode graphite is a randomly oriented polycrystalline pure form of graphite, of about 1.65 grams/cm.$^3$, produced specially as electrodes in spark spectrum devices for chemical analysis. Since it is used as arc electrodes to vaporize materials for chemical analysis by spectral emission methods, it is especially free of chemical elements, which give spectral lines in the part of the spectrum used in the analyses. This means all metals such as iron, nickel, aluminum, etc., and semi-metals such as germanium, antimony, bismuth, etc. are absent.

SP-1 graphite is a special high purity spectroscopic graphite in powder flake form with larger crystals. It is produced by the National Carbon Company and designated as SP-1.

Graphite denoted as B344 is high purity randomly oriented polycrystalline graphite which contains about 0.2–0.3% by weight of boron carbide. These materials are mixed in powder form, compressed and fired at about 1500 to 2000° C. The density of this graphite is about 1.7 to 1.8 grams/cm.$^3$ in solid rods or bars.

Graphite denoted as pyrolytic graphite is graphite formed by the thermal decomposition of a carbonaceous gas such as methane. It is of high purity with oriented crystal structure. This graphite when annealed at about 3000° C. for about 1 hour is termed annealed pyrolytic graphite. The annealed form is highly crystallized with the c-axes of the crystallites parallel.

Ticonderoga graphite is a natural graphite from Ticonderoga, N. Y., and is graphite mined in that locale. This graphite material contains some impurities mechanically adsorbed or interleaved between crystallites. The crystallites may be quite large. Some specimens may be single crystals.

Shawinigan black is a lamp black "amorphous" (i.e. almost non-crystalline) carbon commercially available as Shawinigan black from Shawinigan Chemicals Limited, Shawinigan, Quebec, Canada.

TABLE 5

| | Reaction vessel | Vessel wall matl. | Sample natl. graphite | Pressure, kilobars | Electrical Energy | | Results |
|---|---|---|---|---|---|---|---|
| | | | | | Volts | Farads | |
| Example No.: | | | | | | | |
| 1 | Figure 2 | Py | Sp | 130 | 16 | 1.805 | Cubic diamond. |
| 2 | do | MgO | Sp | 130 | 18 | 0.085 | Do. |
| 3 | do | MgO | Sp | 130 | 18 | 0.085 | Do. |
| 4 | do | Py | Sp | 138 | 33 | 0.040 | Do. |
| 5 | Figure 2, S | Py | Sp | 130 | 16 | 0.085 | Do. |
| 6 | Figure 2, L | Py | Sp | 140 | 20 | 0.085 | Do. |
| 7 | Figure 4 | Py | Sp | 130 | 32 | 0.040 | Do. |
| 8 | do | Alua | Sp | 140 | 30 | 0.040 | Do. |
| 9 | do | MgO | Sp | 140 | 30 | 0.040 | Do. |
| 10 | Figure 2 | Py | Sp | 140 | 25 | 0.040 | Do. |
| 11 | Figure 4 | Py | B344 | 180 | 22 | 0.085 | Do. |
| 12 | do | Py | (¹) | 140 | 31 | 0.040 | Do. |
| 13 | Figure 2 | Py | B344 | 130 | 20 | 0.085 | Do. |
| 14 | do | Py | B344 | 130 | 22 | 0.085 | Do. |
| 15 | do | Py | B344 | 130 | 18 | 0.085 | Do. |
| 16 | Figure 4 | Py | SB | 140 | 26 | 0.040 | Do. |
| 17 | do | Py | SB | 140 | 20 | 0.040 | Do. |

¹ Dixon HB Pencil Lead Graphite.

The examples as given in Table 5 are representative examples of a number of operations. In order to determine minimum conditions several examples were completed at successively higher pressures and temperatures to determine where conversion would and would not take place. For example, with respect to spectroscopic graphite, the conversion to cubic diamond takes place between about 120–130 kilobars as minimum pressure.

Because of the different densities of the various graphites and carbons, and the inadvertent variations in the dimensions of the specimen used in the experiments conducted in connection with this invention, the actual weight of carbon into which the electrical energy is inserted varies somewhat. Thus, what may appear to be minor discrepancies between various examples in Table 5 fall into agreement when corrections are made for density, size and stray energy losses.

To correlate the difference in sample sizes, when transient heating is produced by electrical discharge, a general minimum energy insertion per unit weight of sample is given as about 16–17 kilocalories/mole of non-diamond carbon. This energy insertion defines the point where an upward change in the resistance curve is noted. Accordingly, in practice more input energy is needed for completion. In the practice of this invention with the samples as indicated an average of about 25 kilocalories/mole of non-diamond carbon is utilized.

When the direct conversion of non-diamond carbon to cubic diamond is conducted with the reaction vessel of FIG. 4 and the electrical energy applied is in general accordance with the aforementioned guidelines for energy input, or at least the overvoltage is kept to a minimum, the converted sample has an appearance such as is shown in FIG. 4a. The centrally-located portion 38a is a pill-like formation of cubic diamond. The upper and lower ends of the former graphite sample 38 are unconverted. In the case of graphite sample 32 (sample holder 20 of FIG. 2) the converted material is, likewise, centrally-located along the length of the sample in this manner. The reason for this is that the highest temperature is attained at the center, converting this graphite first. Then, when the pill-like mass of cubic diamond material is formed, the resistance of the circuit quickly rises until short-circuit conditions are approached or reached and in sufficient additional heat can be put into the sample to convert the graphite at the far ends thereof.

Preparation of cubic diamond at various pressure-temperature combinations and using various randomly oriented graphites indicates that the threshold temperature is primarily pressure-dependent as is shown on FIG. 7, wherein line Th is the typical threshold curve for randomly oriented graphites such as spectroscopic graphite and B344 graphite. The method employed to determine curve Th is essentially that of the examples of Table 5 in determining minimum pressures. At a given pressure different electrical energy discharge energies are employed to determine where the conversion does and does not take place and thus a threshold temperature based upon rapid electrical energy input to the sample is obtained. The thickness (horizontal dimension) of area A is dependent on the time of reaction. For example, in the practice of this invention, the reaction may proceed relatively slowly (on the order of 3–5 milliseconds) with the reaction commencing several hundred degrees (° C.) to the left of line M. Where the reaction proceeds more rapidly (in microseconds) the commencement of the reaction is closer to line M and the thickness of area A diminishes. Conversion of graphite to diamond commences in area A and is completed, when line M is reached. Only diamond exists between lines M and $S_2$.

CONVERSION TO CUBIC DIAMOND WITH MELTING AND RECRYSTALLIZATION IN THE ABSENCE OF CATALYST

As was earlier stated, when a graphite material, which converts to electrically conductive cubic diamond, is subjected to high pressures and high temperatures induced by electrical discharge in the manner described hereinabove, the resistance curve rises, but it does not reach open circuit conditions and as a result substantially more electrical energy than is necessary to effect conversion of the graphite to cubic diamond may be inserted into the sample. When these greater amounts (relative to the energy for solid-to-solid conversion) of energy are introduced into such impurity-containing carbon, it is possible to carry the temperature conditions well into liquid region L (FIG. 7) and this is possible, (a) because the graphite is converted to electrically conductive diamond, (b) the heating continues and (c) the cubic diamond formed as the result of solid-to-solid conversion thereafter is melted. The melting of the cubic diamond becomes manifest as an abrupt drop in resistance. Line $S_2$ in FIG. 7 designates the diamond melting line. Line $S_2$ rises upwardly from point $T_2$ curving through previously established points 56, 57 and 58 determined by conversion from pressure volume points (see B. J. Alder and R. H. Christian, Physical Review Letters, vol. 7, p. 367, 1961). Thus, if the heating energy input is sufficient to cause the temperature to cross the threshold curve (Th), whereby impurity-containing graphite is converted to electrically-conducting cubic diamond, and is also high enough to melt the electrically conductive cubic diamond so formed reaching a value of temperature to the right of line $S_2$ and thereby in the liquid carbon region L, a mixture of recrystallized cubic diamond and graphite is obtained by maintaining the pressure above triple point $T_2$ and reducing the temperature to reestablish conditions in the diamond stable region to the left of line $S_2$ in region D. The reason for the creation of any graphite at all during recrystallization from the molten state in the diamond-stable region lacks any rational explanation at the present time.

As an illustration of the manner in which cubic diamond may be produced by recrystallization from the molten state, B344 graphite was employed as a sample. Such a graphite sample and similar graphite discs 34 and 35 were utilized in the reaction vessel of FIG. 4 and placed in the belt apparatus 10 of FIG. 1. Part 36 was thoria, $ThO_2$. Apparatus 10 was then positioned between a pair of platens in a hydraulic press to compress reaction vessel 33 to raise the pressure in graphite sample 38 to about 140 kilobars, which is a pressure above the region of the iron transition by press calibration. Pressure rise may be accomplished slowly or rapidly with no change in the final result, and may also be incremental or constant. In this exemplary practice, pressure rise was completed in about 3 minutes.

After pressure rise was completed and after circuit 41 had been charged, switch 44 was closed for a charge of .085 farad at approximately 26 volts through the sample. After the circuit discharge, calculations of the voltage and current curves to provide resistance show a rise in resistance indicating conversion to cubic diamond, as is the usual case, but then a marked decrease in resistance indicating melting of the cubic diamond and a final rise in resistance indicating recrystallization of graphite to cubic diamond upon cooling at the elevated pressure.

After removal of reaction vessel 33 from apparatus 10, and examining sample 38, it was noted that sample 38 retained its cylindrical configuration and was composed of a great number of very small cubic diamond crystallites mixed with graphite. It was noted that the sample included a shell or coating of greyish white cubic diamond crystals about a dark core. X-ray examination indicated cubic diamond in the core as well as in the shell. Verification of cubic diamond also included cleaning the sample in a heated mixture of concentrated sulphuric acid ($H_2SO_4$) and potassium nitrate ($KNO_3$), and subjecting the sample to scratch tests and buoyancy tests.

A certain amount of modification of the portions of the reaction vessel surrounding the newly formed cubic diamond occurs in all cases as a result of the outward conduction of heat from the extremely hot sample 38. This modification, however, occurs when the discharge of electric current has been substantially depleted and, thus, occurs too late to affect the cubic diamond growth in any way. Such is not the case when modification occurs from the application of large over-voltages.

Additional examples of the practice of this aspect of the invention are set forth in Table 6. In FIG. 4 reaction cell configurations the same kind of graphite was employed for the sample 38 and also for the discs 34 and 35. In Examples 1–2, the reaction vessel of FIG. 2 was employed. In the remainder of the examples, the reaction vessel of FIG. 4 was employed. The abbreviations used designate the following: SB is Shawinigan black carbon, Py is pyrophyllite, MgO is magnesia, and $ThO_2$ is thoria.

TABLE 6

| Example No.: | Sample Graphite | Wall matl. | Pressure, kilobars | Energy Insertion Volts | Energy Insertion Farads | Results |
|---|---|---|---|---|---|---|
| 1 | B344 | Py | 130 | 22 | .085 | Solid black cubic diamond near ends. The center material (from melt) was mostly cubic diamond. |
| 2 | B344 | MgO | 149+ | 25 | .085 | Similar to No. 1. |
| 3 | SB | Py | 140 | 26 | .040 | White cubic diamond around walls; mixture of cubic diamond and graphite in central molten zone. |
| 4 | SB | Py | 140 | 20 | .040 | Do. |
| 5 | SB | $ThO_2$ | 150 | 18 | .085 | Do. |
| 6 | B344 | $ThO_2$ | 150 | 20 | .085 | Do. |
| 7 | B344 | $ThO_2$ | 150− | 25 | .085 | White cubic diamond around walls; mixture of cubic diamond and graphite in central molten zone. Black cubic diamond formed clear to punch faces. |
| 8 | B344 | $ThO_2$ | 145 | 26 | .085 | Do. |
| 9 | B344 | Py | 180 | 22 | .085 | The resulting sample was composed of a thick white cubic diamond cylindrical covering or shell having a small ellipsoidal center section which was black and contained both graphite and cubic diamond recrystallized from molten carbon. |
| 10 | B344 | $ThO_2$ | 180 | 24 | .085 | This example is a repeat of Example 9 for the pressure involved but with a greater energy insertion. The resulting sample was composed of a thin cylindrical shell or coating of grey white cubic diamond with a large ellipsoidal center section of almost 2 times the volume of the center section of Example 2. This center section contained both graphite and cubic diamond recrystallized from the melt. The size of the center section indicates that melting in Example 10 was far more extensive than melting in Example 9. |

When the direct conversion of non-diamond carbon to cubic diamond is conducted with the reaction vessel of FIG. 4, the carbon to be converted will convert to electrically conducting cubic diamond and sufficient energy is applied to melt the cubic diamond so formed, the converted sample usually has an appearance much as is shown in FIG. 4b. Three distinct regions are often found (a) an ellipsoidal center section 38b containing both graphite and recrystallized cubic diamond, (b) a lighter colored cubic diamond shell 38c surrounding the center 38b and (c) portions 38d of darker cubic diamond, which had never been melted, at each end of the graphite sample. Portion 38b was subjected to the highest temperature and portions 38c and 38d in turn to lower temperatures. This phenomenon is reported in Table 6 (Results).

The presence of portions 38d in samples wherein recrystallized cubic diamond was also formed explains why the Examples 11, 14, 16 and 17 of Table 5 are the same as Examples 9, 1, 3 and 4, respectively, of Table 6 and display the same pressure and electrical energy inputs. Thus, in conducting the experiments recorded in Table 6 as Examples 9, 1, 3 and 4, the formation of portions 38d accompanying the recrystallized cubic diamond was recorded as Examples 11, 14, 16 and 17 in Table 5. Despite the fact that portions 38d are electrically conducting cubic diamond, the temperature thereof was not raised to the melting point. Likewise, the cubic diamond in Examples 13 and 15 of Table 5, although it would be electrically conducting, was never melted because of the lower energy input.

In the above examples, cubic diamond melting and cubic diamond recrystallization were evidenced by the shape and inflections of the resistance curves and the amount of energy insertion. This behavior, of course, is dependent upon the electrically conductive nature of the cubic diamond formed. In all examples, the center section showed 50% and greater, by volume, of cubic diamond.

A clear illustration of the aspects of this invention previously described is provided by FIG. 10. In FIG. 10, are three curves $R_1$, $R_2$, and $R_3$. The $R_1$ curve is an exemplary graphite melting curve, $R_2$ is a curve from a graphite to cubic diamond conversion process, wherein the cubic diamond formed is nonconducting, or at least has not been melted, and $R_3$ is a resistance curve taken from the above described example, wherein electrically-conducting cubic diamond is formed and sufficient electrical energy has been introduced to melt the cubic diamond. These examples are essentially duplicates in that the same reaction vessel configuration was used and the energy insertion in kilocalories/moles have been correlated for a standard sample of 0.030 inch diameter and 0.020 inch height. Pressures employed were 118 kilobars for $R_1$, 130 kilobars for $R_2$, and 145 kilobars for $R_3$. The initial rise in the $R_3$ curve at about 8–10 joules corresponds to the initial rise of the $R_2$ curve and indicates conversion of the graphite to cubic diamond. A further example, corresponding to the $R_3$ curve, but with less energy insertion, verified this correlation by reason of recovery of a solid cylindrical cubic diamond compact of a black color.

CONVERSION TO HEXAGONAL DIAMOND WITHOUT MELTING IN THE ABSENCE OF CATALYST

Although the possibility of the existence of a close-packed hexagonal carbon (hexagonal diamond) analogous to the wurtzite phase of boron nitride has been conjectured, the recognition of hexagonal diamond created in the practice of the instant static pressure process has been complicated by two factors. First, X-ray diffraction patterns of the crystalline mass recovered always shows (in addition to the characteristic lines of hexagonal diamond [2.19 A., 1.92 A., 1.17 A. and 0.855 A.], a very strong 3.1 A. line, previously not correctly explained, and second, the lines characteristic of cubic diamond [2.06 A., 1.26 A., 1.076 A. and 0.826 A], are always present as part of the hexagonal diamond lattice. Thus, many crystalline products produced in the practice of this invention were understandably erroneously identified as cubic diamond and in those cases in which attempts were made by an expert crystallographer to factor in the 3.1 A. and 2.19 A. lines, the hexagonal lattice reconstructed therefrom has a calculated density considerably lower than the measured density of the crystalline mass. Finally, it was discovered that the 3.1 A. line was not part of the crystal lattice spectrum, but was actually due to entrapped graphite crystallites under pressure. Once this identification had been made, then the crystallographic reconstruction and correct identification of the close-packed hexagonal diamond lattice was accomplished from the X-ray diffraction data. This form has essentially the same interatomic spacing, density, hardness and index of refraction as cubic diamond, but has a different stacking pattern of the atomic planes. The hexagonal diamond lattice is described as: $a=2.52$ A., $c=4.12$ A., space group $P6_3/mmc.-D_{6h}^4$, 4 atoms per unit cell in $4(f), \pm(\frac{1}{3}\ \frac{2}{3}\ z,\ \frac{2}{3}\ \frac{1}{3}\ \frac{1}{2}+z)$ with $z=\frac{3}{8}$. The calculated density of hexagonal diamond is 3.51 g./cm.$^3$, the same value as for cubic diamond. Hexagonal diamond scratches sapphire easily (a hardness test generally employed for detecting cubic diamond), in the polycrystalline form it has a measured density of greater than 3.33 g./cm.$^3$, the electrical resistivity is several orders of magnitude higher than that of graphite, and the electrical resistance anisotropy is less than two in the different crystal directions.

Thus, of the examples shown in Table 7, Examples 1–6, 11, 12 and 21 were earlier thought to have resulted solely in cubic diamond, the only form of diamond then actually identified. However, as has been indicated, the products were in fact crystalline masses containing hexagonal diamond graphite under pressure and varying amounts of cubic diamond. As may be seen comparing Table 5 and Table 7, hexagonal diamond appears to require particular starting materials. All of the materials successfully employed in the production of hexagonal diamond are well-crystallized graphites with good c-axis orientation, that is, the c-axes of the component graphite crystallites are substantially parallel to each other. When a specimen of any well-crystallized oriented graphite material from which it is desired to prepare hexagonal diamond is placed in a pressure apparatus, such for example as has been described hereinabove, in such a way that it will be compressed by the apparatus mainly in the c-direction of the graphite crystals, and the specimen is subjected to an operating pressure of at least about 130 kilobars, a phase change occurs, this phase change being manifest by a very large increase (over 60,000 times the initial value) in electrical resistance. The onset of the change of phase is manifest even without heating the sample. Once the operating pressure has been reached the reaction (conversion to the new phase) can be greatly accelerated by heating the sample. Since the temperatures necessary in the practice of this aspect of the invention need not exceed 2000° C. static (steady AC) heating of the sample can be employed as described hereinabove. However, unless the temperature is raised to at least about 1000° C., the new crystalline structure will not survive decompression and will revert to graphite during the last part of the decompression. By raising the temperature of the sample to at least about 1000° C., the new phase, hexagonal diamond, is "set" and survives decompression yielding a polycrystalline mass containing hexagonal diamond crystallites.

The transformation from graphite to hexagonal diamond is a solid-to-solid one, that is, it does not involve an intermediate fluid state of any kind. There is a definite preferred orientation relationship between the parent graphite crystal and the hexagonal diamond crystals created therefrom. The c-axis of the hexagonal diamond formed lies perpendicular to both the c- and b-axes of the graphite, while the b-axes are common. The transformation of one crystal form to the other is more complicated than simple shear displacement of the graphite atomic planes. The fit of one lattice to the other is only two-dimensional and it appears that diffusion must occur for further growth of the hexagonal diamond crystal nuclei. This may be the reason that a minimum "setting" temperature is required. It also appears to be the reason that in all specimens prepared to date compressed microcrystal graphite inclusions are always present within the hexagonal diamond material. The shift of the value, and the width, of the primary graphite X-ray diffraction line (3.35 A. to about 3.1 A.) indicates that the trapped graphite crystallites are present under a residual pressure of about 50 kbar.

Example of graphite starting materials, which have been used successfully are: natural "single" crystals, as for example, from Madagascar or Ticonderoga; highly annealed pyrolytic graphites; compacts made of SP–1, a commercial very high purity flake powder graphite of good crystal perfection described hereinabove. The important general requirements are first, the material must be quite will crystallized (that is the crystallite domains must be relatively large and perfect); and second, the c-axes of the crystallite domains must be well aligned in a given direction. Hexagonal diamond cannot, for example, be prepared from spectroscopic graphite, which does not meet these criteria.

Examples 1–8, 11, 12 and 21 employed transient heating whereby the temperatures were carried to temperatures beyond line Th (FIG. 7), while indirect heating was employed in the balance of the diamond-making runs. The indirect heating was accomplished by using a modified construction of the reaction vessel shown in FIG. 2 in that heated elements of tantalum, titanium or platinum were disposed around the graphite sample or extending along the top and bottom of the graphite sample separated therefrom by mica and electrical contact is made with the heater elements to effect resistance heating (steady AC heat). The abbreviations Py, Tic, Magr and Hex represent, pyrophyllite, Ticonderoga, Madagascar and hexagonal, respectively. Apparently, the parameter of time is not critical, because the transient heating occurs for only a short period. However, the steady AC heated examples were heated in some cases for several hours producing yields of 70–90% hexagonal diamond.

An example of a demonstration in which hexagonal diamond was produced in good yield is as follows: the apparatus was a 600-ton high compression "belt." The specimen was highly annealed pyrolytic graphite .009" thick x .048" wide x .240" long (FIG. 2). The c-axis of the graphite was perpendicular to the .048" x .240" dimensions. The graphite was surrounded by pyrophyllite stone. One end was connected by a .023" diameter copper electrode to the top piston face and the other end by a similar electrode to the bottom piston face. The graphite was compressed in the c-axis direction. During compression at room temperature the resistance of the specimen varied as shown in FIG. 11; it remained practically constant until about 2000 p.s.i. ram oil pressure was reached, at which point the resistance turned upward. Over a period of 6 minutes, standing at room temperature, the resistance increased from .028 to .035 ohms. After 24 more minutes, when the power had been turned up to 145 watts (15 v., 95 A.), the resistance of the graphite reached 1.6 ohms. Heating of the sample was generated by passage of the current through the graphite and the temperature midway along the length of the graphite specimen (element 32, FIG. 2), where the hexagonal diamond is formed, surpassed 1500° C. When the applied voltage reached 20 v. the reaction proceeded very rapidly, and although the voltage was increased considerably the current dropped so much that the power input decreased. At 70 v. the current was only slightly above zero. The heating circuit was then removed and the resistance of the sample was measured with an ohmmeter and observed to be 2550 ohms.

During unloading of the press the resistance of the specimen remained essentially constant down to 400 p.s.i. ram oil pressure. There it began to decrease due to partial reversion of the specimen to graphite. From 200 p.s.i. on down the specimen resistance increased again due to deformation of the specimen, contact resistance, etc. After removal from the apparatus it was found that the midspan part of the specimen (the part, which had been hottest) was gray in color, very brittle and hard. It would scratch sapphire readily, a hardness test generally employed for diamond. The X-ray diffraction pattern of this part displayed the following reflections:

| dA. | Intensity |
|---|---|
| 3.4 | weak. |
| 3.1+ | very strong. |
| 2.19 | strong. |
| 2.06 | medium. |
| 1.95 | medium weak. |
| 1.55 | weak. |
| 1.255 | medium strong. |
| 1.17 | weak. |
| 1.075 | medium. |

TABLE 7

| Example No. | Reaction vessel | Confining matl. for sample | Sample type of graphite | Pressure, kilobars | Heating | Type of diamond produced |
|---|---|---|---|---|---|---|
| 1 | Figure 4 | Py | Annealed pyrolytic | 110 | 16 volts, 0.040 farads | Hex. and cubic. |
| 2 | Fig. 4 [1] | Py | do | 130 | 27 volts, 0.040 farads | Do. |
| 3 | do | Py | do | 125 | 36 volts, 0.040 farads | Do. |
| 4 | Fig. 4 | Py | do | 139 | 25 volts, 0.040 farads | Do. |
| 5 | Fig. 2 | Py | do | 130 | 18 volts, 0.085 farads | Do. |
| 6 | do | Py | do | 130 | 22 volts, 0.085 farads | Do. |
| 7 | Fig. 4 | Py | do | >110 | 16 volts, 0.085 farads | Do. |
| 8 | do | Py | do | 140 | 25 volts, 0.042 farads | Do. |
| 9 | Fig. 2 | Py | do | 150 | Steady AC heat temp., >1,000° C | Mostly hex., small amount cubic. |
| 10 | do | Mica | do | 160 | do | Do. |
| 11 | Fig. 4 | Py | SP–1 | 139 | 34 volts, 0.040 farads | Hex. and cubic. |
| 12 | do | Py | SP–1 | 120 | 30 volts, 0.040 farads | Do. |
| 13 | Fig. 2 | Tantalum | SP–1 | 160 | Steady AC heat temp., >1,000° C | Do. |
| 14 | do | do | Annealed pyrolytic | 160 | do | Mostly hex., some cubic. |
| 15 | do | Titanium | do | 160 | do | Do. |
| 16 | do | Platinum | do | 160 | do | Hex. and cubic. |
| 17 | do | do | do | >220 | Steady AC heat temp., >1,500° C | Do. |
| 18 | do | do | do | >160 | Steady AC heat temp., >1,800° C | Do. |
| 19 | do | do | do | >220 | do | Do. |
| 20 | do | do | do | >300 | Steady AC heat temp., >2,000° C | Mostly hex., some cubic. |
| 21 | do | Py | Tic | 130 | 14 volts, 0.085 farads | Hex. and cubic. |
| 22 | do | Platinum | Tic | >200 | Steady AC heat temp., >1,800° C | Mostly hex., some cubic. |
| 23 | do | do | Magr | >200 | Steady AC heat temp., >2,000° C | Do. |
| 24 | do | do | Magr | >200 | Steady AC heat temp., >1,800° C | Do. |

[1] Sample Rectangular .033"X0.37".

The weakness of the 3.4 A. line indicates almost complete absence of unconverted graphite. The strong 3.1 A. line shows the presence of considerable (up to about 20% by volume) trapped compressed graphite. The remainder of the spectrum is characteristic of hexagonal diamond.

The X-ray diffraction pattern of a part of the specimen that was closer to the copper electrodes, where the maximum temperature had been lower than at midspan (which exceeded about 1500° C.), showed hexagonal diamond, ordinary hexagonal graphite and some rhombohedral graphite. Since the spectrum of hexagonal diamond includes all the regular cubic diamond lines it is possible that both parts of the specimen tested could have contained some cubic diamond also. However, the 2.19 A. line was stronger than the 2.06 A. line in both cases, so the fraction of cubic diamond, if any, was quite small compared to hexagonal diamond.

A piece of the midspan part was float-tested in density fluids. It was about neutral in methylene iodide which has a denstiy of 3.33 g./cm.³. Thus the average density of the polycrystalline material was about 3.33 g./cm.³ (compared to the theoretical density of single-crystal hexagonal, or cubic, diamond of 3.51 g./cm.³).

In each instance the crystalline mass, the product of the reaction, contained hexagonal graphite modified with tiny inclusions of compressed graphite even after chemical treatment to remove any ordinary graphite present.

This process, therefore, makes available the conditions for producing a new abrasive material, which hitherto would have been available as a natural material in very small amounts, being created by the extremely high transient pressures and the transient adiabatic temperature increase occurring in a meteorite at and by the shock of impact. This latter occurrence appears to be the only source of natural hexagonal diamond.

In the practice of this invention as set forth herein one preferred form of the apparatus and one preferred circuit have been employed. Other apparatuses are available and are known in the art, which will provide the given conditions, more particularly, apparatus capable of providing pressures at least about the iron transition in the general range of 120–135 kilobars. The "belt type" apparatus as illustrated in FIG. 1 may be scaled up in size and/or the reaction vessel configuration may be suitably changed to provide a larger reaction volume for the practice of this invention. For the production of transient heating the circuit employed may also be altered, the more important requirement being that the circuit will discharge the necessary energy in a shorter period of time compared to the period of time for melting or occurrence of deleterious chemical reactions in the wall materials. As a result, the sample material reaches the required temperature and commences cooling before the surrounding materials have absorbed too much heat. Consequently, with the advent of better temperature resistant materials, the temperature rise time may be lengthened. Accordingly, the ordinary slow resistance heating method as described in the aforementioned U.S. Patent 2,941,248, Hall, might be employed. Temperature rise may be considerably varied in the practice of this invention with the material as described. Variance is accomplished by utilizing different inductance capacitance and voltages for circuit discharge purposes. In Table 5, this difference ranging from 30 volts on .040 farad to 16 volts on .085 farad corresponds to a time delay of temperature rise of about 2½ milliseconds.

The reaction is differentiated in one respect over the reactions described in the aforementioned Patent 2,947,610 in that no molten metals are present in this invention. In the previous patent disclosure as mentioned, the metals as employed are required to become molten at the indicated conditions. In this invention no molten metals are present because no metals are employed, and conversion temperatures obtained preclude gross melting of graphite although some restrictive domain type melting may occur. In the higher temperature ranges, the rapidity of the reaction is such that the conversion temperature is reached in the graphite and cooling is commencing before high temperatures are reached in the surrounding materials.

Representative examples of the teachings of this invention were duplicated in order to determine the effect of the previously required metals on this conversion process. For example, the reaction vessel of this invention was assembled as illustrated in FIG. 2 and an operation as described with respect to Table 5 produced cubic diamond. A second operation duplicated the first but contained a mixture of graphite and nickel powder, nickel being one of the metals previously required. After the operation, an examination of the contents or center portion of the reaction vessel revealed no different reaction or product. The cubic diamond produced was the same in both instances. On the other hand, the nickel powder was relatively unchanged because the reaction time was so short that catalysis did not occur. Repetition of the above process with other metals indicated no apparent change, and the reactions took place without being affected by the added metal.

During the pressure-temperature operation or conversion process, the reaction vessel 20 and sample 32 maintain, generally, their geometrical integrity. This is particularly true of sample 38 of FIG. 4. In the FIG. 4 geometry the full diameter of the center portion of sample 38 is converted to a polycrystalline mass as illustrated in FIG. 4a as 38a. Therefore, cubic or hexagonal diamond may be recovered in various predetermined polycrystalline configurations predicated upon the original cross-sectional configuration of the graphite sample. Variations in sample design of FIG. 2 and other design configurations, and the charge given to circuit 41 may also be provided to lead to substantially all of the graphite sample being converted to cubic diamond. At present the sample recovered from the reaction vessel configuration of FIG. 2 is illustrated in FIG. 2a as a rectangular bar-like form 32a comprising about the central ⅓ length of the former sample 32 intermediate its longitudinal dimension. The cross section is rectangularly shaped while the end sections are slightly rounded. When the original graphite sample is oriented graphite, i.e., annealed pyrolytic graphite properly oriented in the pressure apparatus, the hexagonal diamond compact is composed of hexagonal diamond crystals with corresponding orientation.

One of the salient features of this invention is control. Both temperature and pressure may be individually controlled. For example, practice of this invention may include providing a desired pressure for a given material and changing that pressure for various purposes. Thereafter, circuit 41 may be discharged at predetermined voltage-farad conditions. The minor pressure rise estimated to be less than about 10–20 kilobars, attributable to quick heating has been found not to appreciably affect the control of pressure for this invention. Thus, pressures and temperatures are independent of each other. For example, in FIG. 7, after a conversion to hexagonal or cubic diamond, pressures are maintained in the diamond stable region above the graphite to diamond equilibrium line E for all temperatures which at lower pressures would cause graphitization of the diamond product. For the reverse condititons any diamond (hexagonal or cubic) formed would be graphitized. This may be more particularly described, with respect to FIG. 7, and denotes the prime importance of control. Additionally, control of pressure includes raising and lowering pressure in any desired increments. The independent control features are thus important elements in the practice of this invention.

This invention is described with respect to a static pressure apparatus in which graphite to hexagonal or cubic diamond conversion takes place. In such an apparatus, static pressure may be applied as a first step with variable and long term delay, if desirable, before temperature is raised or circuit 41 discharged. A slow pressure rise is preferred to provide uniform conditions in the various materials. Slow is indicative of operation in minutes preferably but includes operatiton in seconds. Stability of pressures over a reasonable time limit provides more favorable operatiton and more complete conversion and, therefore, larger crystallites. While both pressure and temperature are controlled, pressure is more subject to control because it is maintained under control after any initial application thereof to the final pressure. Controlled pressure is thus differentiated from shock wave pressures because it is a maintained pressure rather than a transient one and because the time rate of change of pressure may be controlled. (One example of a shock or explosive method is described in British Patent 822,363, Oct. 21, 1959.) The reaction time may then be correlated with temperature rise only, this time being generally within about 1 to 5 milliseconds. The length of the time range, however, is only predicated on the materials utilized in the apparatus. While pressure may be raised incrementally in one or more increments so also temperature rise may be in increments when using, an ordinary resistance heating circuit, delayed thermite reactions, or additionally by raising the temperature to a given value below the threshold temperature and then utilizing capacitor discharge for completion of the temperature rise.

Of the various forms of graphite which have been employed in this invention, conversion to cubic diamond has been obtained from hexagonal graphite, graphite containing rhombohedral graphite, and from various kinds of graphite, with pressure being applied either perpendicular or parallel to the c-axis of the graphite crystals. In this invention, graphite samples have been inserted in the reaction vessels with the crystal planes both perpendicular to and parallel to punch faces 19. In the preparation of hexagonal diamond well-crystallized graphite must be used and disposed with the latter orientation; namely, with the c-axis orientation parallel to the direction of compression.

In summary, the practice of this invention to produce cubic diamond includes both operation within region $D_2$ (including area A) with pressures ranging from about 125 to 400–500 kilobars and entry into region L therefrom and return thereto to recrystallize cubic diamond. By separate or external heating means (as opposed to temperature rise by compression or shock), temperatures may be increased to about 4000° K. A preferred temperature ranging is about 2800–4000° K.

The production of hexagonal diamond employs a minimum pressure of about 130 kilobars and the simultaneous application of heat to raise the temperature to in excess of about 1000° C. for about a period of at least two minutes (for static heating) in the well-crystallized graphite employed. In the case of transient heating the "setting" time is in the order of milliseconds.

Both hexagonal and cubic diamond obtained by means of this invention is widely applicable for industrial purposes in the same manner as natural cubic diamonds, for example, as polishing, abrading or cutting materials.

While a specific method and apparatus in accordance with this invention is described and shown, it is not intended that the invention be limited to the particular configuration illustrated, and it is intended by the appended claims to cover all modifications within the spirit and scope of this invention.

What I claim as new and desire to secure by Letters Patent of the United States is:

1. A static pressure method for converting a carbon material to cubic diamond in the absence of a catalyst in a high pressure high temperature apparatus which comprises the steps of:
   placing a quantity of material containing carbon in a high pressure high temperature apparatus,
   controllably subjecting said quantity of material to pressure sufficient to raise the pressure thereof at least as high as the pressure of the solid diamond-solid graphite-liquid carbon triple point, heating said quantity of material to subject said quantity of material simultaneously to conditions of rising temperature and static pressure to initiate the conversion of carbon to cubic diamond at a first point in area A in FIG. 7 of the drawings and proceed at least to a second point along line M in said FIG. 7 having substantially the same pressure as said first point in less than about 5 milliseconds,
   returning the quantity of material so treated to ambient conditions of pressure and temperature and
   recovering cubic diamond from said quantity of material so treated.

2. The method for converting carbon material to cubic diamond substantially as recited in claim 1 wherein the static pressure reached is at least about 120 kilobars and the material is graphite.

3. The method for converting carbon material to cubic diamond substantially as recited in claim 1 wherein the discharge of electric current through the quantity of material occurs in less than one-half second.

4. The method for converting carbon material to cubic diamond substantially as recited in claim 3 wherein the minimum energy insertion per unit weight of carbon present is about 16 kilocalories/mole of carbon.

5. The method for converting carbon material to cubic diamond substantially as recited in claim 1 wherein the pressure and temperature are raised independently.

6. The method for converting carbon material to cubic diamond as recited in claim 1 wherein the heating is accomplished at least in part by the discharge of electric current through the quantity of material.

7. A static pressure method for converting a carbon material to cubic diamond in the absence of a catalyst in a high pressure high temperature apparatus which comprises the steps of:
   placing a quantity of a material containing carbon and an impurity in a high pressure high temperature apparatus,
     said impurity being effective to render electrically conductive the diamond material produced from said carbon by the application of high pressures and high temperatures,
   controllably subjecting said quantity of material to pressure sufficient to raise the pressure thereof at least as high as the pressure of the solid diamond-solid graphite-liquid carbon triple point with the temperature of said quantity of material being less than the temperature of said triple point,
   heating said quantity of material above the melting point of cubic diamond at a pressure above the pressure of said triple point while maintaining the pressure thereof above the pressure of said triple point,
     said raising of temperature being effected at least in part by discharging an electric current through said quantity of materials,
   reducing the temperature of the quantity of material so treated to pressure-temperature conditions in the diamond stable region of pressures and temperatures on the phase diagram of carbon while maintaining the pressure thereof above the pressure of said triple point,
   returning said quantity of material so treated to ambient pressure and temperature conditions, and
   recovering cubic diamond formed in said quantity of material so treated.

8. The method for converting carbon material to cubic diamond substantially as recited in claim 7 wherein the impurity is a source of boron atoms.

9. The method for converting carbon material to cubic diamond substantially as recited in claim 7 wherein the source of carbon is graphite.

10. The method for converting carbon material to cubic diamond substantially as recited in claim 7 wherein the static pressure reached is at least about 120 kilobars and the temperature reached is at least about 4000° Kelvin.

11. The method for converting carbon material to cubic diamond substantially as recited in claim 7 wherein the discharge of electric current takes place in greater than two milliseconds and less than one-half second.

12. The method for converting carbon material to cubic diamond substantially as recited in claim 7 wherein the minimum energy insertion per unit weight of carbon present is about 22 kilocalories/mole of carbon.

13. The method for converting carbon material to cubic diamond substantially as recited in claim 7 wherein the pressure and temperature are raised simultaneously.

14. In a static pressure method for converting carbon material to a diamond crystal lattice structure in a high pressure, high temperature apparatus wherein a quantity of material containing carbon is subjected to static pressure and heat is then applied thereto, the improvement comprising:

(a) placing a quantity of well-crystallized graphite consisting essentially of the hexagonal form, the crystallites of which have their $c$-axes in substantial parallel alignment, in the high pressure, high temperature apparatus with the $c$-axis alignment of said quantity of graphite disposed in the direction of compression of said quantity of graphite, (b) heating said quantity of graphite in the absence of catalyst under static pressure at least as high as the pressure of the solid diamond-solid graphite-liquid carbon triple point to a temperature of at least about 1000° C., (c) returning the quantity of graphite so treated to ambient pressures and temperatures, and (d) recovering hexagonal diamond material from said quantity of material so treated.

15. The improvement substantially as recited in claim 14 wherein the quantity of graphite is annealed pyrolytic graphite.

16. In a static pressure method for converting carbon material to a diamond crystal lattice structure in a high pressure, high temperature apparatus wherein a quantity of material containing carbon is subjected to static pressure and heat is then applied thereto, the improvement comprising:

(a) placing a quantity of well-crystallized graphite consisting essentially of the hexagonal form, the crystallites of which have their $c$-axes in substantial parallel alignment, in the high pressure, high temperature apparatus with the $c$-axis alignment of said quantity of graphite disposed in the direction of compression of said quantity of graphite, and (b) heating said quantity of graphite in the absence of catalyst under static pressure at least as high as the pressure of the solid diamond-solid graphite-liquid carbon triple point to a temperaure of at least about 1000° C.

17. The improvement substantially as recited in claim 16 wherein the quantity of graphite is annealed pyrolytic graphite.

References Cited

UNITED STATES PATENTS

| 3,031,269 | 4/1962 | Bouvenkerk | 23—209.1 |
| 3,148,161 | 8/1964 | Wentorf et al. | 23—209.1 |
| 3,238,019 | 3/1966 | De Carli | 23—209.1 |

OTHER REFERENCES

Wallace, "Product Engineering," vol. 32, Aug. 28, 1961, p. 5.

Ergun et al., "Nature" vol. 195, August 1962, pp. 765–767.

Bundy "J. Chem. Physics" vol. 28, No. 13, February 1963, pp. 631–643.

Hanneman et al. "Science" vol. 155, February 1967, pp. 995–997.

EDWARD J. MEROS, Primary Examiner

U.S. Cl. X.R.

23—209.2